(12) United States Patent
Coez et al.

(10) Patent No.: US 8,385,718 B1
(45) Date of Patent: Feb. 26, 2013

(54) PROCESS FOR PROGRAMMING ACTIONS OF RESOURCES IN A DOMESTIC COMMUNICATION NETWORK

(75) Inventors: Fabienne Coez, Lyons (FR); Nicolas Fannechère, La Ciotat (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 09/719,182

(22) PCT Filed: Jun. 8, 1999

(86) PCT No.: PCT/FR99/01357
§ 371 (c)(1), (2), (4) Date: Feb. 15, 2001

(87) PCT Pub. No.: WO99/65189
PCT Pub. Date: Dec. 16, 1999

(30) Foreign Application Priority Data

Jun. 8, 1998 (FR) ..................................... 98 07187

(51) Int. Cl.
*H04N 9/80* (2006.01)
(52) U.S. Cl. .................... 386/248; 386/262; 386/291
(58) Field of Classification Search .................... 386/46, 386/45, 125, 126, 1, 83, 248, 262, 291; 725/105, 725/110, 114–119; 348/552; 710/113–125, 710/100, 240–244, 305–316; 709/200–208; H04N 5/781, 7/173
See application file for complete search history.

(56) References Cited

U.S. PATENT DOCUMENTS

| | | | | |
|---|---|---|---|---|
| 4,855,730 A | * | 8/1989 | Venners et al. | 340/4.37 |
| 5,065,392 A | * | 11/1991 | Sibbitt et al. | 370/360 |
| 5,890,003 A | * | 3/1999 | Cutts et al. | 710/263 |
| 6,018,816 A | * | 1/2000 | Tateyama | 714/746 |
| 6,108,739 A | * | 8/2000 | James et al. | 710/113 |
| 6,138,221 A | * | 10/2000 | Korst et al. | 711/167 |
| 6,298,370 B1 | * | 10/2001 | Tang et al. | 718/102 |
| 6,353,898 B1 | * | 3/2002 | Wipfel et al. | 714/48 |
| 6,931,430 B1 | * | 8/2005 | Lynch | 709/205 |
| 2001/0037423 A1 | * | 11/2001 | Conway et al. | 710/129 |
| 2004/0133793 A1 | * | 7/2004 | Ginter et al. | 713/193 |

FOREIGN PATENT DOCUMENTS

| | | |
|---|---|---|
| EP | 0535749 | 4/1993 |
| JP | 6-261139 | 9/1994 |
| JP | 8-56352 | 2/1996 |
| JP | 9-233567 | 9/1997 |

OTHER PUBLICATIONS

"Audio Und Video Im Heim-Netzwerk", Funkschau, vol. 63, No. 6, Mar. 8, 1991, pp. 74, 76, 78-79.

* cited by examiner

*Primary Examiner* — Jamie Atala
(74) *Attorney, Agent, or Firm* — Robert D. Shedd; Paul P. Kiel

(57) ABSTRACT

A process for programming actions of resources in a network of domestic devices to enable a user to program an action to be performed by one of the devices from another device. The process includes sending a request for programming an action, the request including a set of parameters defining the action, a time indication, and a list of resources involved in the action. An actions manager verifies the availability of the resources at the time the action is to be carried out, and a message of acceptance or refusal of the programming action is sent out in response to the verification.

21 Claims, 3 Drawing Sheets

PROCESS FOR PROGRAMMING ACTIONS OF RESOURCES IN A DOMESTIC COMMUNICATION NETWORK

This application claims the benefit under 35 U.S.C. §365 of International Application PCT/FR99/01357, filed Jun. 8, 1999, which was published under PCT Article 21(2) on Dec. 16, 1999, and which claims the benefit of French Application FR 98/07187 filed Jun. 8, 1998.

BACKGROUND OF THE INVENTION

The invention relates to a process for programming actions of resources, that is to say of facilities of devices, in a domestic communication network, in particular a network which includes an IEEE 1394-1995 serial bus.

In a domestic communication network to which audio/video devices or "nodes" are linked, a user ought to have the possibility of programming an action to be performed by one of the devices from any device possessing a display. By way of example, it ought to be possible to programme the recording of a transmission by any recording device, for example a video recorder, from any television set or other display means linked to the network.

BRIEF SUMMARY OF THE INVENTION

The invention relates to a process for programming actions of resources in a network of domestic devices, characterized in that it includes the steps of:

sending a request for programming an action by a client application to a manager of preprogrammed actions of a device of the network, the said programming request including a set of parameters defining the action and a list of resources involved in accomplishing the action, verification by the said actions manager of the availability of the resources involved in accomplishing the action, transmission to the client application of a message of acceptance or of refusal of the action on the part of the preprogrammed actions manager depending on the result of the said verification.

According to a particular embodiment, the client application selects a preprogrammed action manager situated in a device other than the client application itself.

According to a particular embodiment, the process includes the step of storage by each resource involved of its agenda with respect to the action.

According to a particular embodiment, the verification step comprises a request of the preprogrammed actions manager from each resource involved aimed at ascertaining the availability of the resources involved by way of their respective agendas.

According to a particular embodiment, at the start time of the action, the preprogrammed actions manager performs the following tasks:

reservation of the resources involved;

establishment of the requested connections between the resources involved;

instigating of the commands with the resources involved.

BRIEF DESCRIPTION OF THE DRAWINGS

Other characteristics and advantages of the invention will become apparent through the description of two nonlimiting exemplary embodiments illustrated by the appended figures in which.

DETAILED DESCRIPTION OF THE INVENTION

Figure 1:
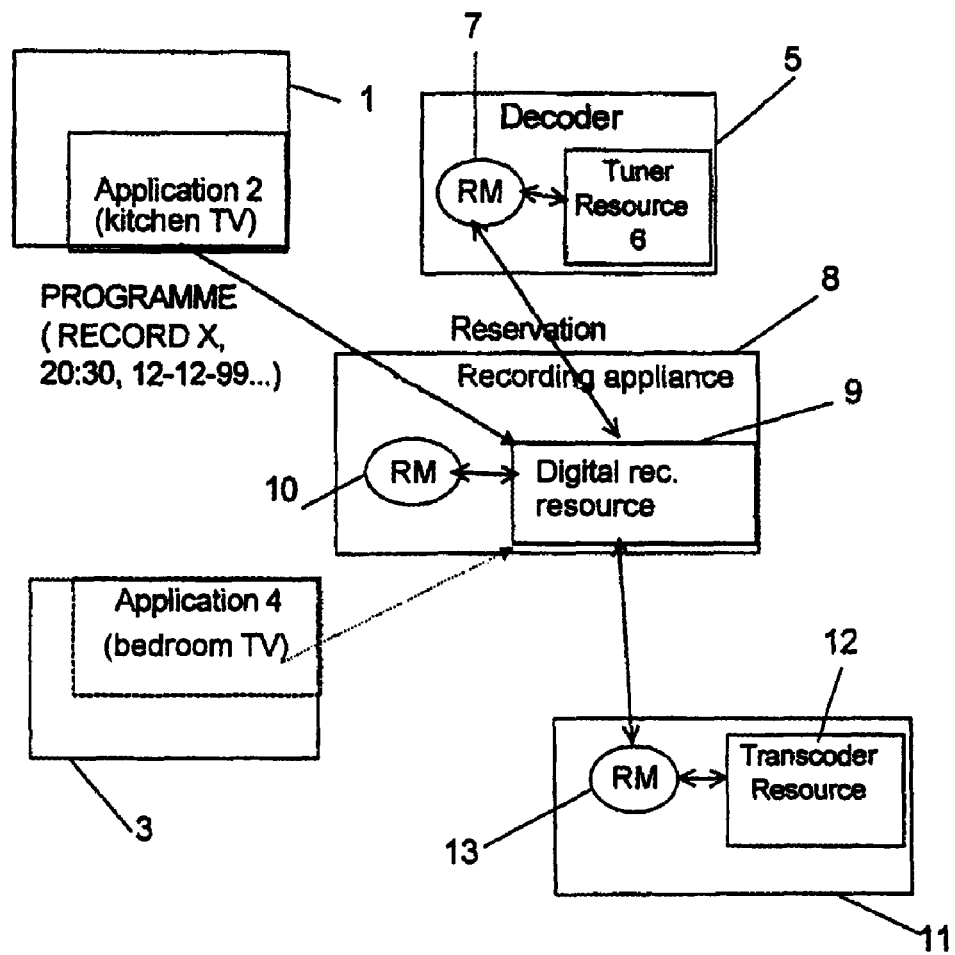
FIG. 1 is a diagram of part of a domestic network representing the manner of operation according to the first exemplary embodiment.

The present description relates to a domestic network based on a serial bus conforming to IEEE 1394-1995, as well as on the architecture referred to as the 'HAVi' architecture, defined in the document 'The HAVi Architecture—Specification of the Home Audio/Video interoperability Architecture' dated 11 May 1998, version 0.8, published on 15 May 1998 on the Internet sites of the Sony, Hitachi, Toshiba, Philips and Sharp companies. A new version of the HAVi document (version 1.0beta+) has been published between the priority date and the date of filing of the present patent application.

Two patent applications filed in the same name as the present application deal in greater detail with certain aspects of the architecture of the network.

These are French Patent Application No. 9805110 of 23 Apr. 1998 entitled 'Procédé de gestion d'objets dans un réseau de communication et dispositif de mise en œuvre' [Process for managing objects in a communication network and device for implementing same], as well as a French patent application filed on the same day as the priority application of the present application and entitled 'Procédé de gestion de priorités d'accès à des ressources dans un réseau domestique et appareil de mise en œuvre' [Process for managing priorities of access to resources in a domestic network and device for implementing same]. The latter patent application bears the number FR 9807186. The first patent application relates to the implementation of registries of objects or of resources in the devices connected to the network, this registry maintaining an up-to-date list of resources or software modules available at local level in a device, whilst the second patent application concerns a resource manager which manages the resource reservation for resources available locally and participates in resolving conflicts of access to—or of reservation of—these resources.

To execute an action, such as recording of a transmission, an application may require access to public resources. The expression public resources is understood within the present context to mean facilities of devices other than the device in which the application is being executed, but which are potentially accessible by this application. The resources which are locally accessible by the application, and also the bandwidth, also form part of the public resources. An application can itself be a resource. The registries mentioned above maintain an up-to-date list of the public resources available, and an application can determine which these resources are by despatching a request at the level of its local registry, which can propagate this request to the other registries.

The designation 'software module' (to use the terminology of the HAVi document) denotes applications, resources and services of a device.

Two exemplary embodiments will be given. According to the first exemplary embodiment, certain functions relating to the implementation of preprogrammed actions are performed by what will be referred to as a 'main resource' in what follows, whilst, according to the second exemplary embodiment, these functions are catered for by an object independent of the resources involved in a preprogrammed action, namely the preprogrammed actions manager ('PAM').

Example 1

The implementation of a preprogrammed action according to the first exemplary embodiment involves:
a client application,
a main resource referred to as the 'target resource' or simply the 'target',
as appropriate one or more other public resources, referred to as the 'resources involved', also required to implement the preprogrammed action.

Within the framework of a recording request, the target is for example the recording facility of a digital recording device (digital video recorder, DVD, etc) whilst a resource involved is a tuner. Other resources may be required: for example a transcoder, required to translate the format of the data into the format of the recording device, an access control service for authorizing access to secure programmes, etc.

Account will be taken of the requirement for the process for implementing the preprogrammed action to operate normally even if the display device by way of which the action was programmed has been rendered inactive (for example, the user has turned off the television set which served him in respect of the programming of a video recorder). It is assumed that this device does not comprise any resources involved (the main resource forming part of the resources involved).

The target does or does not accept the action requested by the application. When programming this action, the target must identify the resources required for the accomplishment of the action and reserve them for the requisite period of time. When the action is actually executed, the target and the resources involved must synchronize themselves. The consequence of this is that information relating to the preprogrammed action has to be stored in the network. According to the first exemplary embodiment, it is the target which stores this information and executes the action, whilst, according to a second embodiment, it is another module which will be responsible for these functions. A preprogrammed action can be defined by a certain number of items of information, collected in a particular data structure filled in by the application programming the action and stored by the target resource.

The type of action
Parameters relating to the action (commands to be performed in respect of each resource involved, list of connections to be established before instigating the action)
A date
A start time
An end time
The periodicity of the action
An identifier of the target resource
The identifiers of the resources involved
User data The type of the action depends on the nature of the target. By way of example the action can be 'RECORD' or 'READ' for a resource having a mass memory facility, or 'SELECT_SERVICE' for a digital television demultiplexer.

The parameters, which depend on the action to be performed, serve to define the action in a more specific manner at the level of each resource. A parameter can be an event or a service within the meaning of the DVB digital video broadcast standard. In this case, the parameters will comprise an identifier of the type of parameter, followed by the value of the parameter.

Certain devices of the network may not include processing means for providing a service of this level. For example, a recording device may not accept parameters after a 'RECORD' command, since it is not itself able to control a tuner, whilst a more complex device, having this possibility, will be able to accept a command of the type 'RECORD service X'.

The date, the start and end times and the periodicity of the action are conventional information.

The identifier of the target resource is required so that an application can modify an already-programmed action. This field is not required if the target stores the preprogrammed action directly (i.e. if this resource is itself the main resource of a programmed action).

If for example an application wishes to ascertain which programmed action is associated with a given resource, it will ask this resource for the identifiers of each of the programmed actions in which this resource is involved. The application will then be able to consult the data structure of the programmed action which it has chosen, then will be able to modify it (this application may for example be that of a user interface, possibly controlled by a user other than the one who programmed the action which will be modified).

The identifiers of the resources involved are used, according to the first exemplary embodiment, by the target. The list allows the target to request information relating to the resources involved, for example by way of the registries, or by transmitting messages to them directly.

The user data include for example in plain text the motive for the action, this possibly being important in the case of conflict with an action programmed earlier. In this case, when the conflict must be resolved by a user, typically the one programming the most recent action, these data may afford him indications as to the importance of the action.

The resources involved contacted by the target resource will themselves also have to store some of the content of the above data structure: the information relating to the time and, possibly, the type of action, the parameters and the user data.

The first exemplary embodiment is illustrated by FIG. 1. The network part represented by this figure comprises five devices. Device 1 is a television set, located in a kitchen and comprising an application 2 (for example a user interface allowing the programming of all the devices of the network). Device 3 is also a television set, this time situated in the bedroom and furnished with an application 4, similar to the application 2. The device 5 is a digital satellite television decoder comprising a tuner resource 6 and a resource manager 7, whilst the device 8 is a DVD-type digital recording device, in this regard comprising the recording resource 9 and a resource manager 10. Finally, the device 11 is for example another decoder, which possesses a facility for transcoding the audio/video data coded according to a first format (that of the decoder 5) into a second format (that of the recording device 8). The device 11 consequently possesses a transcoding resource 12 and a resource manager 13. The various devices, which can comprise software modules other than those illustrated, are linked by a serial bus 14, for example an IEEE 1394-1995 bus.

According to the first exemplary embodiment, the target resource, in the present case the recording function of the device 8, itself incorporates an application capable of managing the recording action.

It is assumed that a user wishes to record a transmission on a service X, at 20.30, on 12 Dec. 1999, for a duration of two hours. Although, in the example of FIG. 1, a single resource of tuner type and a single resource of transcoding type exist in the network, the user could, in a network where several resources of the same type coexist, choose from among several resources of the same type of the network that which he prefers to participate in the execution of the action.

When the target resource 9 receives the programmed action from the application 2, it performs an auto-reservation with the local resource manager 10, by proceeding in the manner described in the second patent application mentioned at the start of this description. Moreover, it performs the reservation of the resources involved (tuner 6, transcoder 12) with the remote resource managers (managers 7, 13 respectively). Each resource manager stores the data relating to the reservation of the resources associated therewith (that is to say of the resources having the same execution platform as this resource manager).

Once the reservations have been made, the target transmits a confirmation message to the application 2 from which the action originated.

In the case of a conflict of reservation, for example in case of override or negotiation for a resource already reserved for an action given by an application programming another action, the resource manager advises the target which programmed the first action by an appropriate message. In fact, for this purpose, each resource manager stores the identifier or the address of the software module which has made a reservation.

At this juncture, should the device 1 be unplugged, the preprogrammed action will nevertheless be executed, since all the information relating to the action is stored at the level of the target.

A user can modify or delete the preprogrammed action from another application, such as the application 4. If the application 4 wants to access all the programmed actions concerning a given resource (which is found by way of the local registry of the application), the resource contacted by the application can give the identifiers of the main resources of each of the programmed actions in which it is involved. The entire data structure describing the programmed action can thereafter be retrieved by contacting each main resource directly.

When the action starts, the target links the various resources by virtue of the local software module referred to as the connection manager (or 'SM' standing for 'Stream Manager' according to the terminology of the HAVi document).

Figure 3:
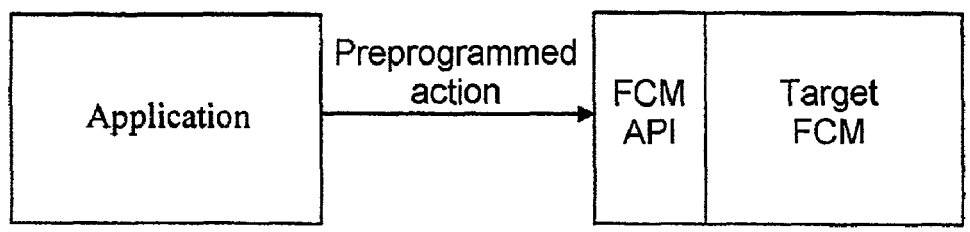
FIG. 3 is a schematic representing data exchanges according to the first exemplary embodiment.

A resource can be designated under the terms function component manager ('FCM' according to the HAVi terminology). The architecture can then be represented by the diagram of FIG. 3, where an application transmits an action programming to the application programming interface forming part of the target.

More generally, resources other than FCMs exist within the HAVi framework. For example, another type of resource exists, referred to as the 'DCM' standing for 'Device Control Manager' or alternatively device control manager. Whereas an FCM is the software representation of a function of a device, a DCM is the software representation of a device and can incorporate several FCMs in this regard. A DCM is then an intermediary between a main application making a reservation and one or more FCMs contained in the DCM.

Example 2

Figure 2:
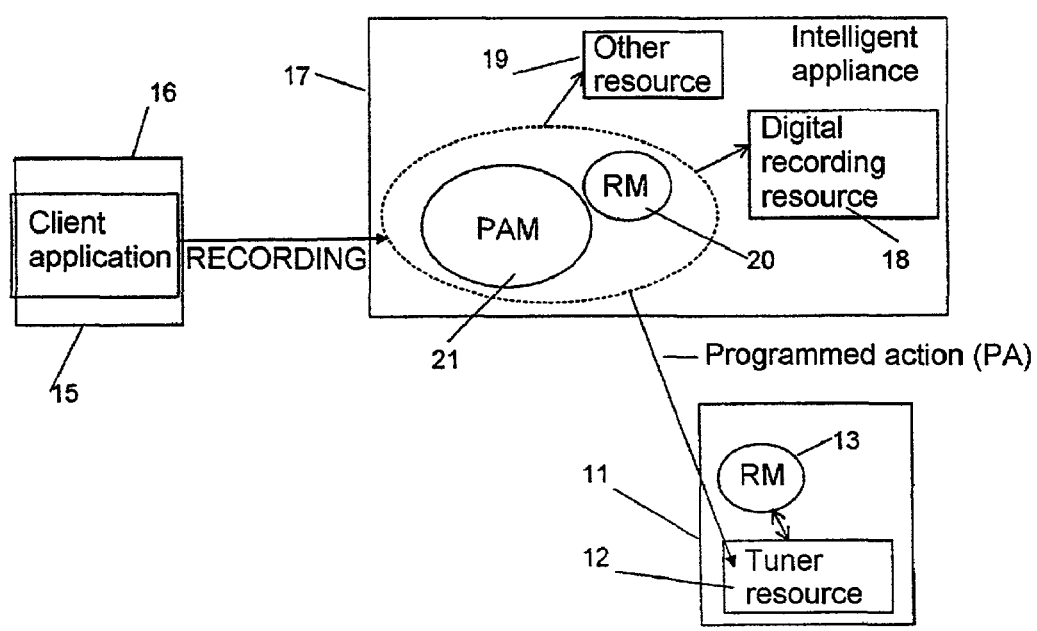
FIG. 2 is a diagram of part of a domestic network representing the manner of operation according to the second exemplary embodiment.

The second exemplary embodiment is illustrated by FIG. 2. It is assumed here that resources do not incorporate applications capable of managing the preprogrammed actions as in the first exemplary embodiment. One will speak in this case of 'passive resources'. The latter may however store some of these data (for example the timetables for the actions which they must perform and possibly parameters and user data), as indicated in the first exemplary embodiment.

The client application 15 initiating the programming of the action is as in the first example an interface localized within a television set 16. The recording device 17 includes the digital recording resource 18, another resource 19, and a resource manager 20. The device 5 is identical to that of FIG. 1.

According to the present exemplary embodiment, the device 17 also includes a preprogrammed actions manager 21 ('PAM'). This actions manager 21 is a service within the meaning of the HAVi document and makes all the reservations required for the accomplishment of the action. There is only one functional difference between the preprogrammed actions manager and the resource manager. Whereas the preprogrammed actions manager manages the preprogrammed actions, the resource manager manages the reservations corresponding to the actions and any conflicts which may ensue. These two functions can be incoporated into one and the same software object, as indicated in FIG. 2. The separate representation of the PAM and of the RM is used simply for the sake of consistency with the first exemplary embodiment, where these functions were implemented by distinct objects.

The actions manager 21 manages the passive resources of the device 17, and also of the device 5. The implementation of a preprogrammed action according to the second exemplary embodiment involves:
  a client application;
  a preprogrammed actions manager ('PAM');
  one or more public resources referred to as the 'resources involved', required to implement the preprogrammed action.

Within the framework of a recording request, the resources involved are for example:
  the recording facility of a digital recording device (digital video recorder, DVD, etc),
  a tuner.

Other resources may be required: for example a transcoder, required to translate the format of the data into the format of the recording device, an access control service for authorizing access to secure programmes, etc.

Account will be taken of the requirement for the process for implementing the preprogrammed action to operate normally even if the display device by way of which the action was programmed has been rendered inactive (for example, the user has turned off the television set which served him in respect of the programming of a video recorder). Consequently, this device preferably does not include the resources involved.

The preprogrammed actions manager does or does not accept the action requested by the client application. The latter has previously identified the resources required for the accomplishment of the action, the commands to be performed at the start time of the action and the connections required between the various resources which need to be established before the start time of the action.

The PAM stores all these data of the action, and returns an identifier of the action to the client application. Moreover, each resource involved stores its own agenda as to the actions to be performed. This agenda includes in particular the timetables of the reservations, but not the commands and connections related to the actions. This would necessitate too much memory room. By virtue of this agenda, each resource can inform other PAMs instigating actions of its availability or unavailability for these actions.

Before accepting or rejecting a request for action, the PAM interrogates each resource so as to ascertain whether it is available between the start and end times of the action. At the start time of the action, if all the resources are present, the PAM reserves the resources (here, this entails reservation proper, as compared with simple agenda indications programmed previously), establishes the necessary connections and instigates the commands. The establishing of the connections is requested of the local software module referred to as the connections manager (or 'SM' or 'Stream Manager' according to the terminology of the HAVi document).

If one of the resources involved in a preprogrammed action disappears before the start time of the action, the latter is suspended until the resource is again available on the network. If the missing resource reappears, even after the start time of the preprogrammed action, the action is nevertheless executed, although shifted in time.

A preprogrammed action can be defined by a number of information items, collected in a particular data structure filled in by the application programming the action and stored according to the second exemplary embodiment by the preprogrammed actions manager.

The type of action
Parameters relating to the action (commands to be performed in respect of each resource involved, list of connections to be established before instigating the action)
A date
A start time
An end time
The periodicity of the action
The identifiers of the resources involved
User data The various elements have a similar meaning to what was described in conjunction with the first exemplary embodiment.

If an application wants to ascertain which preprogrammed action is associated with a given resource, it can consult all the programmed actions which are recorded in a PAM. It could also request from the resource the identifiers of each of the preprogrammed actions in which this resource is involved. It can therefore retrieve the identifier of the PAM which maintains the data of a given preprogrammed action.

An application also has the possibility of cancelling a preprogrammed action, or of modifying such an action, at the PAM in charge of this action.

The identifiers of the resources involved are used according to the second exemplary embodiment by the PAM. The list enables the PAM to request information relating to the resources involved, for example by way of the registries, or by transmitting messages directly to them.

The PAM distributes the preprogrammed action to the device control managers (DCM—see hereinbelow) of the resources involved, with all the parameters required for each resource. Each resource (or their DCM) must determine whether the connections requested and the commands envisaged will be able to be performed at the time envisaged.

If the resources are capable of honouring the request, they advise the PAM of this, the latter returning an identifier of the action to the client application to signal to it that the action has been taken on board.

If the resources are not capable of honouring the request, or if one of the requested resources is not present on the network, or else if the overriding of a resource involved and already reserved within the framework of another action has not been possible, the PAM refuses the preprogrammed action, transmitting an appropriate message to the client application.

In case of conflict of reservation, for example in case of override or negotiation of an unavailable resource, the PAM advises the client application which programmed the action by an appropriate message. In fact, for this purpose each PAM stores the identifier or the address of the application which has made a reservation.

A resource can be designated under the terms function component manager ('FCM' according to the HAVi terminology). The architecture can then be represented by the diagram of FIG. 3, where an application transmits an action programming to the application programming interface forming part of the target.

More generally, resources other than FCMs exist within the HAVi framework. Another type of resource likewise exists, referred to as the 'DCM' standing for 'Device Control Manager' or alternatively device control manager. Whereas an FCM is the software representation of a function of a device, a DCM is the software representation of a device and can incorporate several FCMs in this regard. A DCM is then an intermediary between a main application making a reservation and one or more FCMs contained in the DCM.

Figure 4:
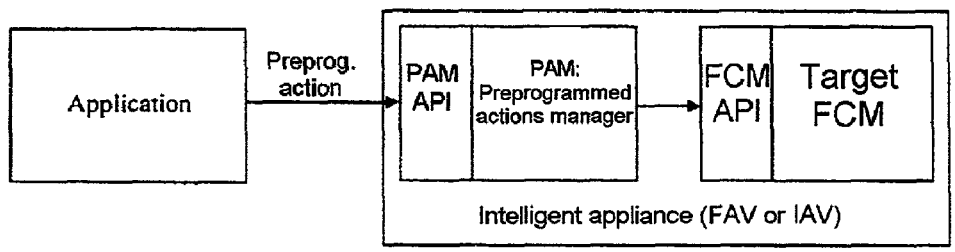
FIG. 4 is a schematic representing data exchanges according to the second exemplary embodiment.

FIG. 4 is a simplified diagram of the principle of the second embodiment. To summarize, to programme an action, an application addresses itself to the preprogrammed actions manager, which is necessarily present in the device comprising the target resource. The application acts through the programming interface of the actions manager, which in turn acts through the programming interface of the target. The device comprising the manager and the target is either a device with full facilities ('FAV'), or a device with intermediate facilities ('IAV').

The invention claimed is:

1. Process for programming actions of resources in a network of domestic devices, including the steps of:
   sending a request for programming an action by a client application to a manager of preprogrammed actions of a device of the network, the programming request including a set of parameters defining the action including a time indication and a list of resources involved in accomplishing the action,
   verification by the actions manager that the resources involved in accomplishing the action will be available at a time when the action is to be carried out as specified by the time indication,
   transmission to the client application of a message of acceptance or of refusal of the programming of the action on the part of the preprogrammed actions manager depending on the result of the verification.

2. Process according to claim 1, wherein the client application selects a preprogrammed action manager situated in a device other than the client application itself.

3. Process according to claim 1, further including the step of storage by each resource involved of its timetable with respect to the action.

4. Process according to claim 1, wherein the verification step comprises sending a request, by the preprogrammed actions manager, to each resource involved, for ascertaining the availability of the resources involved in view of their respective reservation timetables.

5. Process according to claim 1, wherein the request comprises a list of connections to be established before the action is initiated.

6. Process according to claim 1, wherein the request comprises a start time of the action.

7. Process according to claim 1, wherein the request comprises an end time of the action.

8. Process according to claim 1, wherein the request comprises a data item identifying a periodicity of the action.

9. Process according to claim 5, wherein, at the time specified in the request, the preprogrammed actions manager performs the following tasks:
   reservation of the resources involved;
   establishment of the requested connections between the resources involved;
   instigating of the commands with the resources involved.

10. Process according to claim 1, wherein the verification step comprises the step of sending, to a device control manager of a given resource listed in the request, action parameters corresponding to the resource, wherein the device control manager acts as an intermediary between the preprogrammed actions manager and the given resource.

11. Process according to claim 1, further comprising the step of providing an identifier of an action by the preprogrammed action manager to the requesting application in case the action is accepted.

12. Process for programming actions of resources in a network of domestic devices, comprising the steps of:
   sending a request for programming an action by a client application to a manager of preprogrammed actions of a device of the network, the programming request including a set of parameters defining the action including a time indication and a list of resources involved in accomplishing the action,
   reception by the client application of a message of acceptance or of refusal of the programming of the action on the part of the preprogrammed actions manager depending on the result of a verification by the preprogrammed action manager that the resources involved in accomplishing the action will be available at a time when the action is to be carried out as specified by the time indication.

13. Process according to claim 12, wherein the client application selects a preprogrammed action manager situated in a device other than the client application itself.

14. Process according to claim 12, wherein the request comprises a start time of the action.

15. Process according to claim 12, wherein the request comprises an end time of the action.

16. Process according to claim 12, wherein the request comprises a data item identifying a periodicity of the action.

17. Process according to claim 12, wherein the request comprises a list of connections to be established before the action is initiated.

18. Process for programming actions of resources in a network of domestic devices, comprising the steps of:
   receiving, by a preprogrammed action manager of a network device, a request for programming an action sent by a client application, the programming request including a set of parameters defining the action including a time indication and a list of resources involved in accomplishing the action,
   sending to the client application, by the preprogrammed action manager, a message of acceptance or of refusal of the programming of the action on the part of the preprogrammed actions manager depending on the result of a verification by the preprogrammed action manager that the resources involved in accomplishing the action will be available at a time when the action is to be carried out as specified by the time indication.

19. Process according to claim 18, wherein the verification step comprises sending a request, by the preprogrammed actions manager, to each resource involved, for ascertaining the availability of the resources involved in view of their respective reservation timetables.

20. Process according to claim 18, wherein the verification step comprises the step of sending, to a device control manager of a given resource listed in the request, action parameters corresponding to the resource, wherein the device control manager acts as an intermediary between the preprogrammed actions manager and the given resource.

21. Process according to claim 18, further comprising the step of providing an identifier of an action by the preprogrammed action manager to the requesting application in case the action is accepted.

\* \* \* \* \*